March 5, 1968
R. A. PISCITELLO ET AL
3,372,330
ARC WELDING DECAY HEAT CONTROL SYSTEM
WITH MOVABLE CORE TRANSFORMER
Filed Jan. 14, 1964
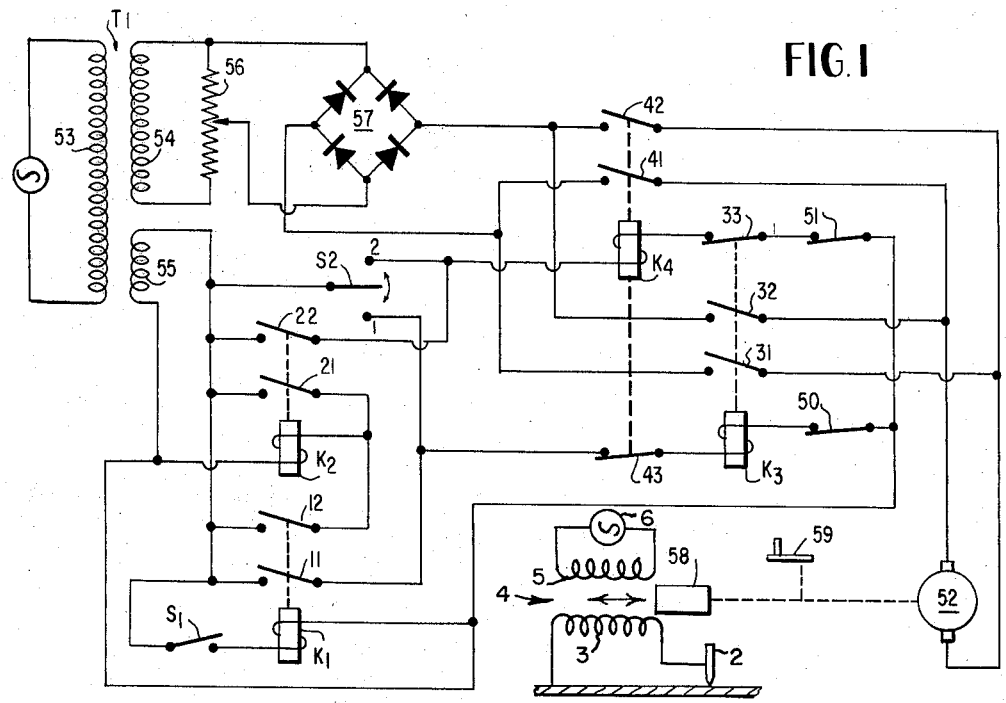
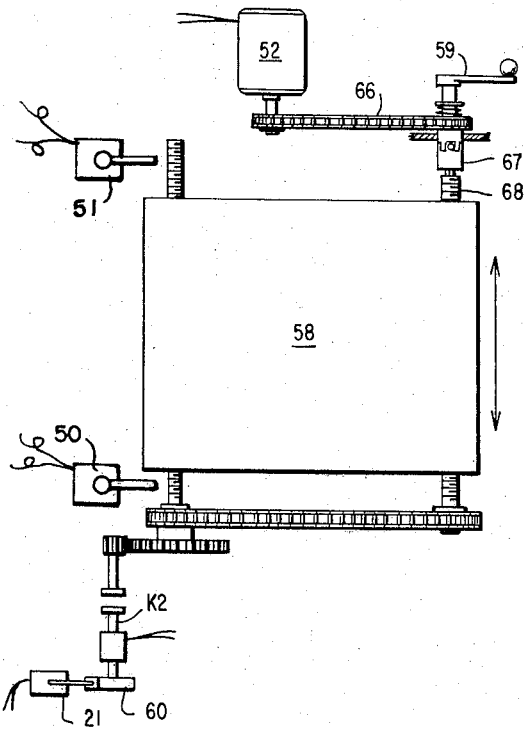
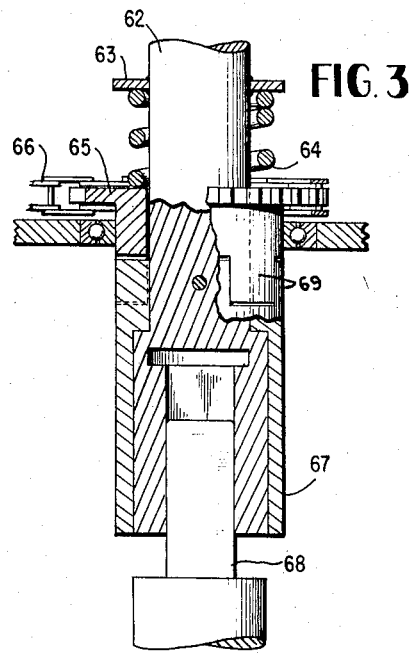
INVENTORS
ROBERT A. PISCITELLO
ARTHUR E. PETIT
BERNARD V. WOLSKI
BY *Robert B. Harmon*
ATTORNEY

United States Patent Office 3,372,330
Patented Mar. 5, 1968

3,372,330
ARC WELDING DECAY HEAT CONTROL SYSTEM WITH MOVABLE CASE TRANSFORMER
Robert A. Piscitello Uncasville, Arthur E. Petit, Hadlyme, and Bernard V. Wolski, Waterford, Conn., assignors to General Dynamics Corporation, New York, N.Y., a corporation of Delaware
Filed Jan. 14, 1964, Ser. No. 337,652
9 Claims. (Cl. 323—51)

This invention relates to a decay heat control for electric arc welding machines of the motor driven movable core type.

Heretofore electric arc welders have been subject to the manual control of the operators. At the end of any welding pass, the operator had to reduce the heat of the arc by having an assistant, at the welding machine, manually move the core until the current was decreased sufficiently to break the arc. The obvious disadvantages of this method are the time involved and the extra man required.

The alternative to the extra man has been for the operator to draw his arc to the side of the weld, out of the puddle until there is a gap great enough between the welding rod and the metal being welded to break the arc. Should the operator be less than highly skilled at this technique or should he execute this maneuver too rapidly a condition known as "suck up" will occur. It has been determined that decaying the heat (lowering the amperage sufficiently to cool the weld) when completing a weld will prevent this condition.

It is therefore an object of this invention to provide a control for electric arc welding machines which will automatically decrease the amperage at a constant rate until the arc is broken.

Another object of this invention is to provide a control for electric arc welding machines which will prevent the formation of craters, cracks, and/or "suck up."

Another object of this invention is to provide a control for electric arc welding machines having an automatic decay cycle which includes decay from an initial setting and resetting to the initial setting after decay as well as selectively controlling the core position.

Another object of this invention is to provide an automatic decay heat control with switching means at local and remote positions.

Another object of this invention is to provide a control which enables the operator to automatically decay the heat of an arc without moving from the welding position.

Still another object of this invention is to provide a decay heat control which will reset the welding machine to its original heat setting after the decay operation.

Another object of this invention is to provide an automatic decay heat control which has a decay heat cycle and allows selective heat adjustment and may be operated from either local or remote positions.

These and other objects and features of the present invention will be apparent from the following detailed description taken with reference to the figures of the accompanying drawing in which:

FIGURE 1 is a schematic diagram of a circuit embodying the invention;

FIGURE 2 illustrates the actuating means for moving the core of the welding machine of this invention;

FIGURE 3 is a detailed, enlarged illustration of a portion of FIGURE 2 illustrating the mechanical clutch used in conjunction with the electrical means for adjusting the core setting.

As illustrated schematically in FIG. 1, the present invention is used to control the current supplied to an arc welding electrode 2 by the secondary winding 3 of a transformer 4 having its primary winding 5 connected to an alternating current source 6 in a conventional manner. In accordance with conventional practice, a magnetically permeable core member 58 is moved into or out of the transformer windings to provide greater or less coupling between them and thereby increase or decrease the current in the secondary winding connected to the electrode.

The circuit of FIGURE 1 is utilized to control the voltage applied to the driving motor 52 for moving the core member 58 so as to control the direction in which the motor turns, the rate at which it turns, and the termination of motor operation. The control over the driving motor 52 is accomplished mainly through the use of two switches, S1 and S2, and relays K1, K3 and K4 and clutch solenoid K2, and their associated contacts. The control basically has two modes, first a decay cycle and second a selective adjustment.

The decay cycle is initiated by closing switch S1 which energizes relay K1 making contacts 11 and 12. Contact 11 completes the circuit to energize K3, the down relay. When K3 is energized, contacts 31 and 32 close while contact 33 opens. Contacts 31 and 32 complete the path for power to the driving motor 52 and cause it to start driving the core 58 downwards. Contact 33 which opened when relay K3 energized, breaks the path to the up relay K4 disabling the up circuit while the decay switch S1 is closed. The driving motor 52 will continue to drive downwards until either the decay switch S1 is opened or the down limit switch 50 is opened.

Contact 12, when closed, completes a circuit to energize K2, the clutch solenoid, closing contacts 21 and 22 with contact 21 locking in the clutch solenoid. This contact is a portion of the memory circuit and is cammed open when the core has been reset to the initial position, as shown in FIG. 2.

Contact 22 would complete the circuit for the up relay K4 except that relay K3 is energized and has opened contact 33 to disable the up circuit.

When either the decay switch S1 is opened or the down limit switch 50 is opened, relay K3 will be de-energized opening contacts 31 and 32 closing contact 33. The up relay K4 will now be energized closing contacts 41 and 42 and opening contact 43. Closing of contacts 41 and 42 will cause the driving motor 52 to run in reverse and thereby drive the core upwards. Meanwhile the opening of contact 43 will disable the down relay K3.

The down limit switch 50 will close when the core begins to drive upwards. The decay switch S1 is opened by the operator. Opening the decay switch S1 will de-energize relay K1 and open contacts 11 and 12. The clutch solenoid K2 will remain energized until contact 21 is cammed open by the memory circuit cam. When contact 21 is opened, clutch solenoid K2 will be de-energized opening contact 22 which will de-energize the up relay K4 opening contacts 41 and 42 to de-energize the driving motor and close contact 43 to prepare the circuit for the next control movement.

When the decay switch S1 is closed, power is also supplied to the solenoid K2 shown in FIGURE 2, which engages the memory control, through a gear train, to the shaft that drives the core of the welding machine. This memory control automatically resets the current output of the machine to the original amperage setting when the decay heat switch is released. This is accomplished by the micro switch 21 actuated by a cam 60, which rotates a proportionate number of turns relative to the number of turns required to decrease (move the core down), the current to zero. This micro switch completes the circuit to reverse direction of the driving motor 52 by locking up solenoid K2 when the decay switch S1 is opened. When the driving motor 52 drives in the reverse direction, driving the core upwards, the memory cam is also driven back in a proportionate number of turns until the micro switch actuator falls in a valley of the cam and opens the motor and solenoid circuits. At this point, the cam is at a neutral position and the electro-mechanical clutch 61 is disengaged from the core drive shaft leaving the machine at its original setting.

The second mode of operation allows for selective adjustment of the core. Selective adjustment is accomplished by switch S2 being placed in engagement with either contact 1 or 2. Closing switch S2 with contact 1 will energize the down relay K3. Closing switch S2 with contact 2 will energize the up relay K4. Energizing either relay will cause the driving motor 52 to move the core in the desired direction by the operation of their respective contacts as described for the decay mode. The main difference between th modes is that in the selective adjustment mode the clutch relay K2 is not energized and the memory circuit is not used.

Power is supplied to the control through a transformer T1. This particular circuit has 220 v. A.C. applied to primary winding 53 of the transformer. The secondary winding 54 picks off 115 v. A.C. for the motor control. The secondary winding 55 picks off 24 v. A.C. for the relay circuitry. The rate of decay is adjusted with the variable resistor 56. The motor control power is rectified by the bridge 57 and is fed to the driving motor 52 through the various relay controlled circuits previously described.

This particular decay heat control has a mechanical means to adjust the core shown in FIGURE 2 and in detail in FIGURE 3. The core 58 is adjusted electrically through the driving motor 52, drive chain 66 and screw gear 68. This may be, in effect, overridden by using the mechanical adjusting means.

The mechanical adjusting means consists of a shaft 62 which is kept in an engaged position by the action of spring 64 against the spring retainer 63 and the chain sprocket 65. The chain sprocket 65 forms the upper portion of the clutch. The lower portion 67 of the clutch is fixed to the shaft 62. The contacting surfaces of the two clutch portions have suitable interengaging teeth 69. The lower portion 67 is in continual engagement with the driving screw 68.

The manual means is used by depressing the handle 59 and shaft 62, driving the lower portion 67 away from the vertically fixed chain sprocket 65 compressing spring 64. The portion 67 slides down the screw gear 68 a sufficient distance to disengage the clutch teeth 69. The core may now be adjusted without affecting the electrical adjusting means. When the handle 59 is released, the spring 64 will expand, driving the shaft 62 upwards and engaging the clutch portions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A decay heat control system for electric arc welding machines of the motor driven movable core type comprising a decay circuit means which when energized cause said motor to drive said core from an initial set position to the zero current output positions, means to adjust the rate of decay, memory circuit means energized with said decay circuit, said memory circuit causing said core to be driven back to the initial set position upon de-energization of said decay circuit, and circuit means which will allow said core to be selectively adjusted without energizing said decay circuit.

2. A decay heat control system for electric arc welding machines of the motor driven movable core type comprising a core drive motor, decay circuit means which when energized cause the core to be driven by the core drive motor to a zero current output position, said decay circuit automatically causing the core to be driven by the core drive motor back to an initial setting immediately upon de-energization of said circuit, means to control the rate of decay, and means for causing said core to stop at its initial setting.

3. A decay heat control system for electric arc welding machines of the motor driven movable core type comprising a core drive motor, circuit means which when energized will cause the driver motor to drive the core through the decay cycle, means to adjust the rate of decay, circuit means which allow adjustment of the core position without activating the decay cycle, switching means capable of activating the decay cycle and the core adjustment, and mechanical means which allow the manual adjustment of the core position.

4. A decay heat control for movable core type welding machines, comprising core drive means, said control, when energized, causing the core to be driven by the drive means from an initial position decreasing the current output to zero, said control, when de-energized, automatically causing the core to be reset by the drive means in the initial position, said control having a means to govern the rate of decay, local and remote means for activating said control, and both mechanical and electrical means to adjust the core setting without involving the decay circuitry.

5. A decay heat control for movable core type welding machines, comprising drive means for causing the core to be driven from an initial setting decreasing the current to zero when energized, said control having an associated memory circuit which will cause the core to be reset to the initial setting when the control is de-energized, said memory circuit being by-passed when the control is used for adjusting the core to achieve the proper operating heat, local and remote means of operating said control, and a mechanical means at the machine to locally control the core setting.

6. A decay heat control system for electric arc welding machines of the motor, driven movable core type comprising a core drive motor, decay circuit means which, when energized, causes said core to be driven by the core drive motor through a decay cycle, memory means which causes the core drive motor to reset said core at its original position at the end of said cycle, means to adjust the rate of decay, circuit means which permits selective adjustment of the core without activating the decay cycle, first and second switching means, both of said switching means being capable of activating the decay cycle and the selective core adjustment, and mechanical means for selective manual adjustment of the core position.

7. A decay heat control system for electric arc welding machines of the motor driven movable core type comprising a core drive motor, decay circuit means which, when energized, cause said core to be driven by the core driven motor from an initial position to the zero current output position, means to adjust the rate of decay, memory means energized with said decay circuit which causes said core to be reset by the motor to the initial position upon de-energization of said decay circuit, selective adjusting means for moving said core without energizing said decay circuit, first and second switching means, each switching means being capable of activating said decay circuit and said selective adjusting circuit, and mechanical means for manual adjustment of said core.

8. A decay heat control system for electric arc welding machines of the motor driven movable core type comprising a core drive motor, first and second switching means, either of said switching means controlling both the decay cycle and selective adjustment of said core, said switching means when actuated to a first position causing said core to be driven by said motor from an initial setting to a zero current output setting, said switching means, upon release from the first position, causing said core to be driven by said motor towards the initial setting a memory means for terminating the drive motor operation when the core reaches said initial setting, and said switching means allowing selective adjustment of the core position when actuated to a second position.

9. A decay heat control system for electric arc welding machines of the motor driven movable core type comprising a core drive means, a first and second switching means controlling the positioning of said core and the decay cycle movement of said core, one of said switching means, when actuated, causing said motor to drive said core from an initial setting to a zero current output setting, said switching means, when released, causing said motor to drive said core back to said initial setting, a memory means which is activated when said switch means is actuated, said memory means causing the motor to stop driving the core when said initial setting is reached, said switching means being capable of adjusting said core without going through the decay cycle.

References Cited

UNITED STATES PATENTS

| | | | |
|---|---|---|---|
| 2,133,919 | 10/1938 | Fries | 219—131 X |
| 2,309,280 | 1/1943 | Stansbury | 219—108 X |
| 2,529,280 | 1/1943 | Steinberger | 219—131 |
| 2,931,967 | 4/1960 | Mills | 323—51 |

JOHN F. COUCH, *Primary Examiner.*

W. E. RAY, *Assistant Examiner.*

UNITED STATES PATENT OFFICE
CERTIFICATE OF CORRECTION

Patent No. 3,372,330　　　　　　　　　　　　　　March 5, 1968

Robert A. Piscitello et al.

It is certified that error appears in the above identified patent and that said Letters Patent are hereby corrected as shown below:

Column 2, lines 25 and 37, "circuit", each occurrence, should read -- circuitry --. Column 3, line 15, "th" should read -- the --; line 66, "positions" should read -- position --. Column 4, line 11, "driver" should read -- drive --; line 56, "driven", second occurrence, should read -- drive --. Column 5, line 7, "means" first occurrence, should read -- motor --. Column 6, line 9, "2,529,280　　1/1943" should read -- 2,529,111　　11/1950 --.

Signed and sealed this 29th day of July 1969.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents